(12) United States Patent
Park et al.

(10) Patent No.: US 11,940,058 B2
(45) Date of Patent: Mar. 26, 2024

(54) SOLENOID VALVE

(71) Applicants: HYUNDAI MOTOR COMPANY, Seoul (KR); KIA CORPORATION, Seoul (KR); SAMBO MOTORS CO., LTD, Daegu (KR)

(72) Inventors: In Tae Park, Yongin-si (KR); Ji Gyeon Kim, Seoul (KR); Jun Young Park, Uiwang-si (KR); Dong Woo Kim, Siheung-si (KR)

(73) Assignees: HYUNDAI MOTOR COMPANY, Seoul (KR); KIA CORPORATION, Seoul (KR); SAMBO MOTORS CO., LTD, Daegu (KR)

( * ) Notice: Subject to any disclaimer, the term of this patent is extended or adjusted under 35 U.S.C. 154(b) by 0 days.

(21) Appl. No.: 17/893,335

(22) Filed: Aug. 23, 2022

(65) Prior Publication Data
US 2023/0265938 A1 Aug. 24, 2023

(30) Foreign Application Priority Data

Feb. 18, 2022 (KR) ........................ 10-2022-0021685

(51) Int. Cl.
*F16K 31/06* (2006.01)
*F16K 31/363* (2006.01)
*F16K 47/00* (2006.01)

(52) U.S. Cl.
CPC ...... *F16K 31/0696* (2013.01); *F16K 31/0655* (2013.01); *F16K 31/363* (2013.01); *F16K 47/01* (2021.08)

(58) Field of Classification Search
None
See application file for complete search history.

(56) References Cited

U.S. PATENT DOCUMENTS

| 2,693,929 | A | * | 11/1954 | Hart | F16K 31/0655 |
| | | | | | 251/360 |
| 2,888,233 | A | * | 5/1959 | Windsor | F16K 31/408 |
| | | | | | 335/251 |
| 4,526,340 | A | * | 7/1985 | Kolchinsky | F16K 31/408 |
| | | | | | 251/38 |
| 4,967,786 | A | * | 11/1990 | DuHack | F16K 31/408 |
| | | | | | 137/329.04 |
| 4,981,155 | A | * | 1/1991 | Pick | F16K 31/404 |
| | | | | | 251/30.05 |

(Continued)

FOREIGN PATENT DOCUMENTS

| JP | 2014-228075 A | 12/2014 |
| JP | 2019-143655 A | 8/2019 |

(Continued)

*Primary Examiner* — Matthew W Jellett
(74) *Attorney, Agent, or Firm* — MCDONNELL BOEHNEN HULBERT & BERGHOFF LLP

(57) ABSTRACT

A solenoid valve includes a plunger configured to be movable in two opposite directions, a damper member inserted into the plunger and having at least a part protruding outward from the plunger, and a pilot member disposed in a lower region of the plunger and having a pilot flow path formed therein, in which the damper member comes into close contact with the pilot member and closes the pilot flow path when the plunger moves downward by a predetermined distance toward the pilot member.

10 Claims, 3 Drawing Sheets

(56) References Cited

U.S. PATENT DOCUMENTS

| | | | |
|---|---|---|---|
| 6,443,420 B1* | 9/2002 | Hettinger | F16K 39/024 |
| | | | 251/38 |
| 6,453,930 B1* | 9/2002 | Linkner, Jr. | B60T 8/363 |
| | | | 137/271 |
| 6,679,567 B1* | 1/2004 | Tackett | B60T 8/363 |
| | | | 303/119.2 |
| 10,760,637 B2 | 9/2020 | Manger et al. | |
| 2004/0045539 A1* | 3/2004 | Furuta | F16K 31/0679 |
| | | | 123/529 |

FOREIGN PATENT DOCUMENTS

| | | |
|---|---|---|
| JP | 2021-27143 A | 2/2021 |
| KR | 2013-0031129 A | 3/2013 |
| KR | 10-1469671 B1 | 12/2014 |

\* cited by examiner

SOLENOID VALVE

CROSS REFERENCE TO RELATED APPLICATIONS

This application claims priority to and the benefit of Korean Patent Application No. 10-2022-0021685 filed in the Korean Intellectual Property Office on Feb. 18, 2022, the entire contents of which are incorporated herein by reference.

TECHNICAL FIELD

The present disclosure relates to a solenoid valve, and more particularly, to a solenoid valve capable of controlling a flow of a fluid.

BACKGROUND

A solenoid valve is configured to close or open a flow path by moving a plunger by adjusting a magnetic field generated by electric current flowing through a coil. More specifically, the plunger disposed at one side of the coil moves depending on intensity of the magnetic field, thereby controlling an operation of closing or opening the flow path.

Meanwhile, a damper is disposed on the plunger to reduce noise and impact that occur when the plunger collides with a member that guides a movement direction of the plunger or core.

In addition, in a case in which a pilot structure is adopted to reduce a force applied by the solenoid valve to close or open the flow path, a pilot sealing member is disposed on the plunger and seals a pilot flow path provided in the pilot structure.

However, in the related art, since both the damper and the pilot sealing member are disposed on the plunger, an additional process of fixing the components to the plunger needs to be performed. In addition, in the related art, a pressure in a space between the plunger and the damper, and a pressure in a space between the plunger and the pilot sealing member are increased during a process of operating the solenoid valve, which causes the damper and the pilot sealing member to swell or separate from the plunger. In some cases, a separate vent hole through which a fluid is discharged is formed in the plunger in order to solve the above-mentioned problem. However, a process of forming the separate vent hole also increases the number of processes, which causes a problem of increasing the time and costs required to manufacture the solenoid valve.

SUMMARY

The present disclosure has been made in an effort to reduce the time and costs required to manufacture a solenoid valve by integrating a damper and a pilot sealing member disposed on the solenoid valve.

An exemplary embodiment of the present disclosure provides a solenoid valve including a plunger configured to be movable in two opposite directions, a damper member inserted into the plunger and having at least a part protruding outward from the plunger, and a pilot member disposed in a lower region of the plunger and having a pilot flow path formed therein, in which the damper member comes into close contact with the pilot member and closes the pilot flow path when the plunger moves downward by a predetermined distance toward the pilot member.

The solenoid valve may further include a core unit disposed above the damper member and facing the damper member, the core unit being configured to come into contact with the damper member when the plunger moves by a predetermined distance toward the core unit, and the core unit may have a recessed core region having a shape recessed inward.

A front recessed damper region may be formed in a region of the damper member that faces the recessed core region.

The damper member may have a lateral recessed damper region formed in a lateral surface of the damper member and having a shape recessed in a width direction W intersecting a longitudinal direction L of the damper member.

An entire lateral region of the damper member may be sealed by the plunger from the outside.

A region of the damper member, which faces the core unit, may have a shape convexly protruding toward the core unit except for the front recessed damper region.

An internal space S may be formed in a lower region of the plunger, the pilot member may be inserted into the internal space S, the plunger may have an inner protrusion region protruding toward the internal space and formed on an inner surface that defines the internal space, and the pilot member may have an outer protrusion region protruding outward and formed on a portion of the pilot member that is inserted into the internal space S, the outer protrusion region being configured to interfere with the inner protrusion region.

A distance D1 in an upward/downward direction H between the damper member and a lowermost end of the outer protrusion region may be shorter than a distance D2 in the upward/downward direction H between the damper member and an uppermost end of the inner protrusion region.

The front recessed damper region may have a shape that penetrates the damper member in a horizontal direction.

The solenoid valve may further include a sealing member inserted into a lower region of the pilot member.

The solenoid valve may further include an orifice member disposed below the pilot member and having a communication flow path that communicates with the pilot flow path.

A through flow path may be formed in one surface of the plunger and communicate with the internal space S.

According to the present disclosure, it is possible to reduce the time and costs required to manufacture the solenoid valve by integrating the damper and the pilot sealing member disposed on the solenoid valve.

DETAILED DESCRIPTION

Hereinafter, a solenoid valve 10 according to the present disclosure will be described with reference to the drawings.

Figure 1:
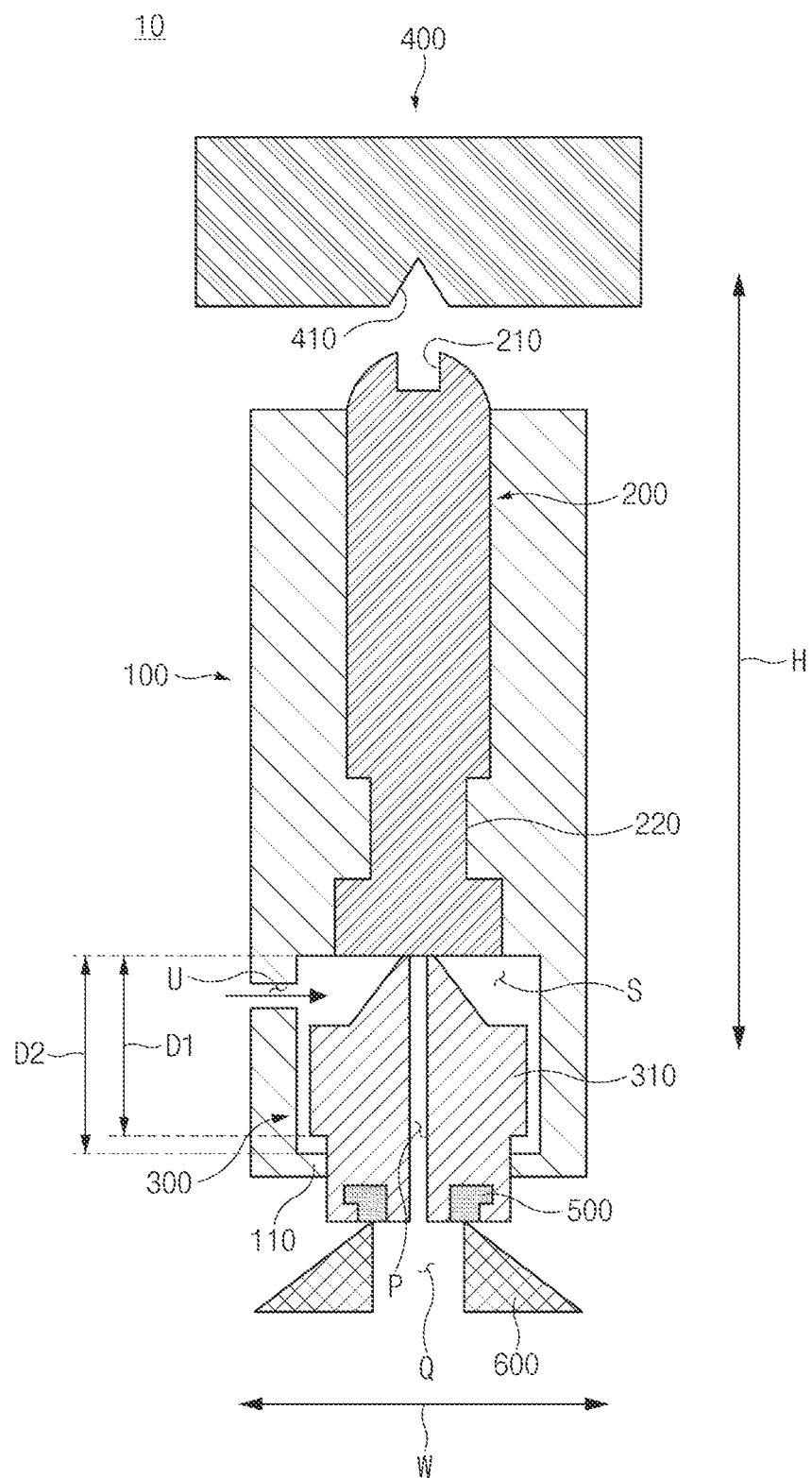
FIG. 1 is a view schematically illustrating a cross-sectional structure of a solenoid valve according to the present disclosure in which a damper member closes a pilot flow path of a pilot member.
Figure 2:
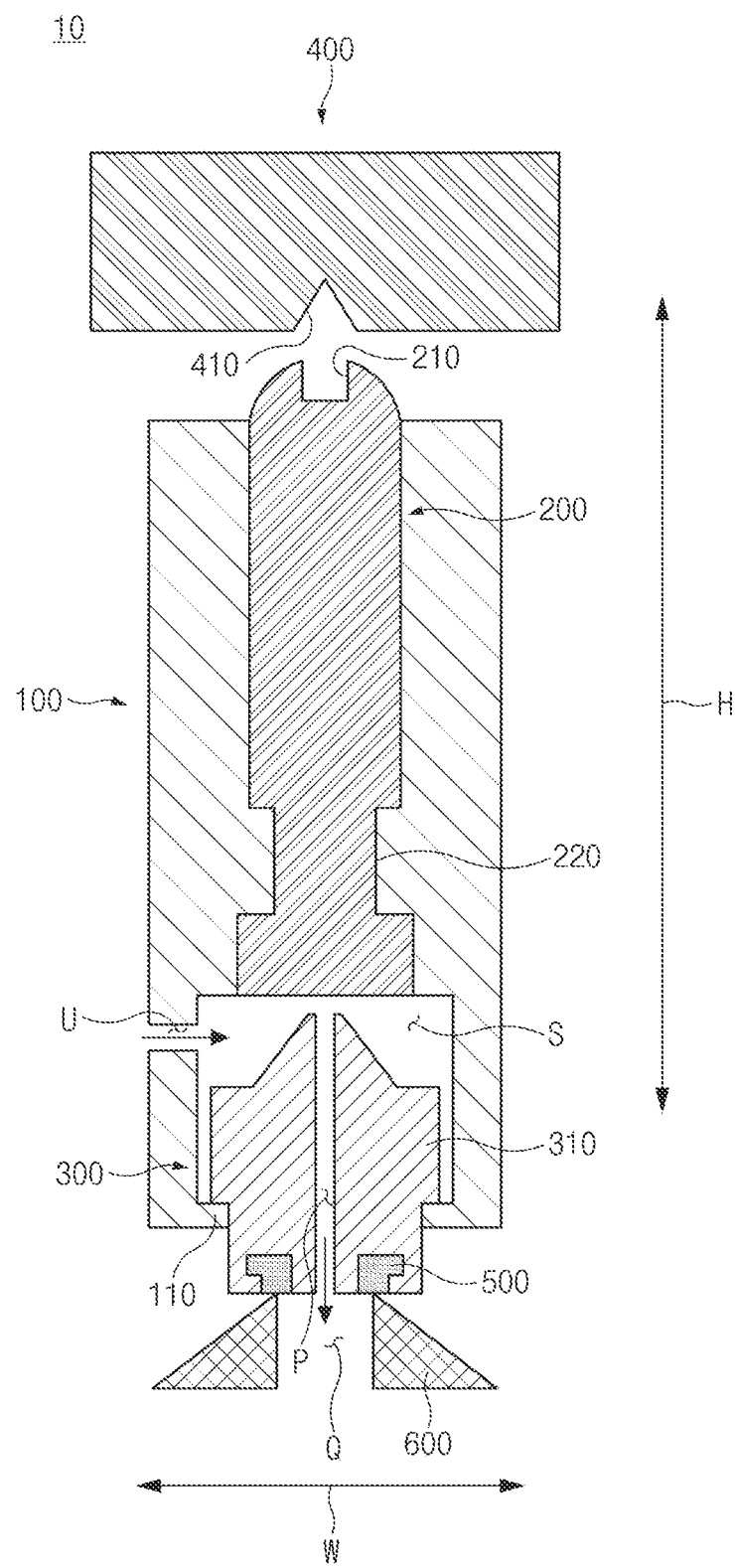
FIG. 2 is a view schematically illustrating a cross-sectional structure of the solenoid valve according to the present disclosure in which a plunger moves upward, and the damper member moves away from the pilot member, such that the pilot flow path is opened.
Figure 3:
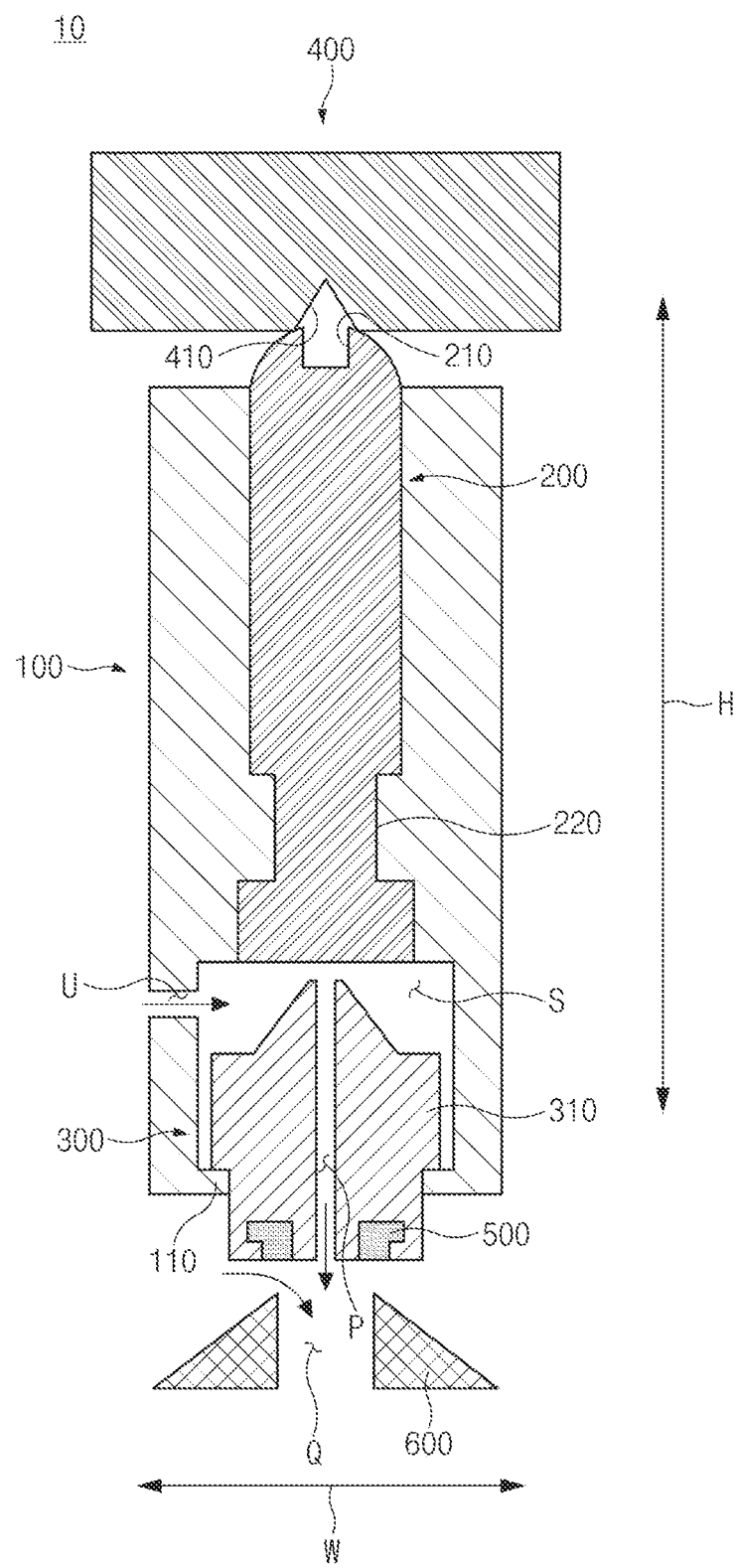
FIG. 3 is a view schematically illustrating a cross-sectional structure of the solenoid valve according to the present disclosure in which the plunger further moves upward from the state illustrated in FIG. 2, the damper member comes into contact with a core unit, such that the pilot member moves away from an orifice member.

FIG. 1 is a view schematically illustrating a cross-sectional structure of a solenoid valve according to the present disclosure in which a damper member closes a pilot flow path of a pilot member. FIG. 2 is a view schematically illustrating a cross-sectional structure of the solenoid valve according to the present disclosure in which a plunger moves upward, and the damper member moves away from the pilot member, such that the pilot flow path is opened. FIG. 3 is a view schematically illustrating a cross-sectional structure of the solenoid valve according to the present disclosure in which the plunger further moves upward from the state illustrated in FIG. 2, the damper member comes into contact with a core unit, such that the pilot member moves away from an orifice member.

The solenoid valve 10 according to the present disclosure is configured to open or close a flow path by moving a plunger 100 by controlling a magnetic field generated by electric current flow through a coil (not illustrated).

The solenoid valve 10 may include the plunger 100 configured to be movable in two opposite directions. Referring to the drawings, the plunger 100 may move in a vertical (upward/downward) direction H of the solenoid valve 10.

In addition, the solenoid valve 10 may include a damper member 200 inserted into the plunger 100, and having at least a part protruding outward from the plunger 100. The drawings illustrate that the damper member 200 is inserted into the plunger 100 in the vertical direction, and that the damper member 200 protrudes outward through an upper region of the plunger 100. The damper member 200 may be configured to reduce noise and impact by preventing the plunger 100 from colliding directly with another component, i.e., a core unit 400 to be described below during a process in which the plunger 100 moves. The damper member 200 may be a non-magnetic element. For example, the damper member 200 may be made of a rubber material.

In addition, the solenoid valve 10 may further include a pilot member 300 disposed in a lower region of the plunger 100 and having a pilot flow path P formed therein. For example, as illustrated in the drawings, an internal space S may be formed in the lower region of the plunger 100, and the pilot member 300 may be inserted into the internal space S.

The pilot flow path P formed in the pilot member 300 may be opened or closed depending on operating states of the solenoid valve 10. Therefore, a sealing member for sealing the pilot flow path P needs to be provided in the solenoid valve 10.

According to the present disclosure, the damper member 200 may serve not only to reduce noise and impact due to the movement of the plunger 100, but also to selectively seal the pilot flow path P. Therefore, according to the present disclosure, it is possible to eliminate a separate sealing member configured to seal the pilot flow path P in the pilot member 300.

To achieve the above-mentioned object, according to the present disclosure, the damper member 200 may close the pilot flow path P by coming into close contact with the pilot member 300 when the plunger 100 moves downward by a predetermined distance toward the pilot member 300. More specifically, the damper member 200 may face the internal space S formed in the lower region of the plunger 100. Therefore, as illustrated in the drawings, the damper member 200 may have a shape extending in the upward/downward direction H from the upper region of the plunger 100 to the internal space S. In this case, it is possible to prevent the damper member 200 from swelling or separating from the plunger 100 because a pressure in a space between the damper member 200 and the plunger 100 increases. Therefore, it is not necessary for the plunger 100 to have a vent hole that allows the space between the damper member 200 and the plunger 100 to communicate with the outside of the solenoid valve 10 in order to reduce the pressure in the space between the damper member 200 and the plunger 100. That is, according to the present disclosure, the entire lateral region of the damper member 200 based on a horizontal (width) direction W may be sealed by the plunger 100 from the outside. This configuration may be understood as a configuration in which the above-mentioned vent hole is not formed in the plunger 100 of the solenoid valve 10 according to the present disclosure.

Meanwhile, referring to the drawings, the solenoid valve 10 according to the present disclosure may further include the core unit 400 disposed above the damper member 200 and facing the damper member 200. The core unit 400 may come into contact with the damper member 200 when the plunger 100 moves by a predetermined distance toward the core unit 400. The core unit 400 may be configured to improve driving efficiency of the solenoid valve 10 by providing the plunger 100 with the magnetic field generated by the electric current flowing through the coil (not illustrated). Therefore, the plunger 100 may be a magnetic element that may be magnetized by the magnetic field.

Meanwhile, the core unit 400 may have a recessed core region 410 having a shape recessed inward. A front recessed damper region 210 having a shape recessed inward may be formed in a region of the damper member 200 that faces the recessed core region 410.

As described above, when the plunger 100 moves by a predetermined distance toward the core unit 400, the damper member 200 comes into contact with the core unit 400. However, when the plunger 100 moves away from the core unit 400 again, the damper member 200 fixed to the plunger 100 also needs to move away from the core unit 400.

According to the present disclosure, the damper member 200 may have the front recessed damper region 210. Therefore, an area in which the damper member 200 and the core unit 400 are in contact with each other may be reduced even in the state in which the damper member 200 and the core unit 400 are in contact with each other. Further, outside air may enter and exit the front recessed damper region 210, which may minimize an unnecessary bonding force between the damper member 200 and the core unit 400. Therefore, it is possible to assuredly allow the damper member 200 having been in contact with the core unit 400 to move away from the core unit 400 when the plunger 100 moves away from the core unit 400. More particularly, the front recessed damper region 210 may be provided in the form of a slit that penetrates the damper member 200 in a horizontal direction so that the outside air may freely enter the front recessed damper region 210.

Referring to the drawings, the damper member 200 may have a lateral recessed damper region 220 formed in a lateral surface of the damper member 200 and having a shape recessed in the width direction W intersecting a longitudinal direction L of the damper member 200. The plunger 100 may protrude inward toward the lateral recessed damper region 220.

As described above, the damper member 200 may be a non-magnetic element, whereas the plunger 100 may be a magnetic element. The lateral recessed damper region 220 may be configured to minimize a volume in the plunger 100 occupied by the damper member 200 which is the non-magnetic element. Therefore, a magnetic force made by the magnetic field generated by the electric current flowing through the coil (not illustrated) may increase a force applied to the plunger 100. Furthermore, since the plunger 100 has the structure protruding inward toward the lateral recessed damper region 220, the interference between the plunger 100 and the damper member 200 may prevent the damper member 200 from moving in the upward/downward direction relative to the plunger 100.

Meanwhile, as illustrated in the drawings, the region of the damper member 200, which faces the core unit 400, may have a shape convexly protruding toward the core unit 400 except for the front recessed damper region 210. In this case, it is possible to minimize noise and impact that occur because of the contact between the damper member 200 and the core unit 400 caused by the movement of the plunger 100.

Meanwhile, according to the present disclosure, the pilot member 300 may also move together with the plunger 100 when the plunger 100 moves. To this end, the solenoid valve 10 according to the present disclosure may have a structure in which the plunger 100 and the pilot member 300 may interfere with each other.

More specifically, referring to the drawings, the plunger 100 may have an inner protrusion region 110 protruding toward the internal space S and formed on an inner surface that defines the internal space S. Further, the pilot member 300 may have an outer protrusion region 310 protruding outward and formed on a portion of the pilot member 300 that is inserted into the internal space S, the outer protrusion region 310 being configured to interfere with the inner protrusion region 110. More particularly, the inner protrusion region 110 and the outer protrusion region 310 may each have a shape protruding in the horizontal direction W, and the outer protrusion region 310 may be disposed above the inner protrusion region 110. Therefore, when the plunger 100 moves upward by a predetermined distance or more, the pilot member 300 may also be moved upward together with the plunger 100 by the interference between the outer protrusion region 310 and the inner protrusion region 110.

Meanwhile, when the plunger 100 moves upward by a predetermined distance or more, the interference between the inner protrusion region 110 and the outer protrusion region 310 enables the pilot member 300 to also move upward together with the plunger 100 as described above (see FIG. 3). In contrast, when the plunger 100 moves upward by a distance less than the predetermined distance, the pilot member 300 may not move upward (see FIG. 2). When the plunger 100 moves upward by a distance less than the predetermined distance, the damper member 200 may be spaced apart from the pilot member 300, such that the pilot flow path P is opened. In contrast, when the plunger 100 moves upward by the predetermined distance or more, the pilot member 300 may also move upward, such that an additional flow path is formed between the pilot member 300 and an orifice member 600 to be described below.

To achieve the above-mentioned object, according to the present disclosure, a distance D1 in the vertical direction H between the damper member 200 and a lowermost end of the outer protrusion region 310 may be shorter than a distance D2 in the vertical direction H between the damper member 200 and an uppermost end of the inner protrusion region 110.

Referring to the drawings, the solenoid valve 10 according to the present disclosure may include a sealing member 500 inserted and coupled into a lower region of the pilot member 300, and the orifice member 600 disposed below the pilot member 300 and having a communication flow path Q that communicates with the pilot flow path P. The sealing member 500 may be disposed in a region facing the orifice member 600. Therefore, when the sealing member 500 comes into contact with the orifice member 600, it is possible to ensure sealability between the sealing member 500 and the orifice member 600. Therefore, the sealing member 500 may face the orifice member 600. However, because the sealing member 500 is fixedly coupled to the pilot member 300, the sealing member 500 may move away from the orifice member 600 when the pilot member 300 moves upward.

In addition, according to the present disclosure, a through flow path U may be formed in one surface of the plunger 100 and communicate with the internal space S.

A method of operating the solenoid valve 10 according to the present disclosure will be described below with reference to the above-mentioned contents and the drawings.

When a magnetic field is formed at the periphery of the plunger by electric current flowing through the core (not illustrated) in a state in which the plunger 100 is spaced apart downward from the core unit 400 and the damper member 200 is in close contact with the pilot member 300 as illustrated in FIG. 1, the plunger 100 is moved upward by the magnetic force, and the damper member 200 is moved upward away from the pilot member 300, as illustrated in FIG. 2. Therefore, the fluid introduced through the through flow path U flows into the pilot flow path P of the pilot member 300 and flows downward through the communication flow path Q.

Meanwhile, the pilot flow path P, the communication flow path Q, and the portion below the communication flow path Q are filled with the fluid, such that the force applied by the fluid to press the solenoid valve 10 including the pilot member 300 upward increases. Therefore, as illustrated in FIG. 3, the pilot member 300 and the plunger 100 additionally move upward, such that the damper member 200 comes into contact with the core unit 400. Therefore, the pilot member 300 may move away from the orifice member 600, and the fluid may be additionally introduced through the space between the pilot member 300 and the orifice member 600.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

The invention claimed is:

1. A solenoid valve comprising:
   a plunger configured to be movable in two opposite directions;
   a damper member inserted into the plunger and having at least a part protruding outward from the plunger; and
   a pilot member positioned in a lower region of the plunger, the pilot member having a pilot flow path;
   wherein the damper member comes into contact with the pilot member and closes the pilot flow path when the plunger moves downward by a predetermined distance toward the pilot member;
   wherein the solenoid valve further comprises:
      a core unit positioned above the damper member and facing the damper member, the core unit being configured to come into contact with the damper member when the plunger moves by a predetermined distance toward the core unit;

wherein the core unit has a surface and a recessed core region having a shape recessed inward from the surface; and wherein a front recessed damper region is formed in a region of the damper member that faces the recessed core region.

2. The solenoid valve of claim 1, wherein the damper member has a lateral recessed damper region formed in a lateral surface of the damper member, wherein the recessed damper region has a shape recessed in a horizontal direction intersecting a longitudinal direction of the damper member.

3. The solenoid valve of claim 1, wherein an entire lateral region of the damper member is sealed by the plunger from an outside.

4. The solenoid valve of claim 1, wherein a region of the damper member facing the core unit has a shape convexly protruding toward the core unit, except for the front recessed damper region.

5. The solenoid valve of claim 1, wherein the front recessed damper region has a shape that penetrates the damper member in a horizontal direction.

6. The solenoid valve of claim 1, further comprising:
an orifice member positioned below the pilot member, the orifice member having a communication flow path that communicates with the pilot flow path.

7. The solenoid valve of claim 1, further comprising:
a sealing member inserted into a lower region of the pilot member.

8. The solenoid valve of claim 1 wherein a through flow path is formed in one surface of the plunger and communicates with the internal space.

9. The solenoid valve of claim 1, wherein the front recessed damper region is provided in the form of a slit that penetrates the damper member in a horizontal direction.

10. A solenoid valve comprising:
a plunger configured to be movable in two opposite directions;
a damper member inserted into the plunger and having at least a part protruding outward from the plunger; and
a pilot member positioned in a lower region of the plunger, the pilot member having a pilot flow path;
wherein the damper member comes into contact with the pilot member and closes the pilot flow path when the plunger moves downward by a predetermined distance toward the pilot member;
wherein an internal space is formed in a lower region of the plunger, the pilot member is inserted into the internal space, the plunger has an inner protrusion region protruding toward the internal space and formed on an inner surface that defines the internal space, and the pilot member has an outer protrusion region protruding outward and formed on a portion of the pilot member that is inserted into the internal space, the outer protrusion region being configured to interfere with the inner protrusion region; and
wherein a distance in a vertical direction between the damper member and a lowermost end of the outer protrusion region is shorter than a distance in the vertical direction between the damper member and an uppermost end of the inner protrusion region.

* * * * *